United States Patent [19]
Onove

[11] Patent Number: 6,096,366
[45] Date of Patent: Aug. 1, 2000

[54] PROCESS OF MAKING A MARINATED FROZEN GARLIC PRODUCT

[76] Inventor: Margaret M. Onove, 4250 NW. 30th St., Apt. 251, Coconut Creek, Fla. 33066

[21] Appl. No.: 09/215,364

[22] Filed: Dec. 18, 1998

[51] Int. Cl.⁷ ....................................................... A23L 1/223
[52] U.S. Cl. .......................... 426/638; 426/518; 426/524; 426/589; 426/615
[58] Field of Search ..................................... 426/615, 638, 426/589, 518, 524

[56] References Cited

U.S. PATENT DOCUMENTS 3,424,593  1/1969  Beckman ................................. 426/638

FOREIGN PATENT DOCUMENTS

| 02594006 | 8/1987 | France | 426/638 |
| 3525258 | 2/1986 | Germany | 426/638 |
| 0066955 | 4/1985 | Japan . | |
| 0087759 | 5/1985 | Japan | 426/638 |

*Primary Examiner*—Helen Pratt

[57] ABSTRACT

A process of making a marinated frozen garlic product in which the garlic is marinated in vinegar, minced, combined with olive oil, and frozen.

1 Claim, No Drawings

PROCESS OF MAKING A MARINATED FROZEN GARLIC PRODUCT

BACKGROUND OF THE INVENTION

The fresh garlic is a healthy herb, prepared as a ready to use condiment, which is not available in the market place as of this date. The garlic is minced, seasoned, and frozen. The garlic is always freezer fresh, economic, and has a long freezer life-span. The product is used directly from the freezer, after taking only the required amount from the garlic container. This process avoids a time consuming preparation in a very busy kitchen.

Garlic cloves were extensively used in recipes from my Italian family and this tradition has continued to the present. During my working career the heads of garlic were purchased, peeled and pickled. Over time, I thought of avoiding the pickling and changed to marinating, mincing and freezing.

Ingredients
    Ready pealed fresh garlic cloves.
    Distilled white vinegar.
    Italian olive oil.
    Dehydrated parsley flakes.

Processing
    Marinate fresh garlic cloves for four hours in vinegar.
    Drain vinegar from garlic
    Mince garlic
    Shake parsley flakes sparingly on the minced garlic and olive oil.
    Process the seasoned minced garlic into containers.
    Place containers of garlic in the freezer.
    Garlic is ready for sale direct from the freezer.
    Processing the above requires the usage of plastic gloves on hands at all times.

I claim:

1. A method of preparing frozen garlic comprising
    (a) marinating fresh garlic cloves for four hours in vinegar;
    (b) draining vinegar from said garlic;
    (c) mincing said garlic;
    (d) shaking parsley flakes sparingly on said minced garlic and olive oil;
    (e) processing said seasoned minced garlic into containers;
    (f) placing containers of said garlic in a freezer.

\* \* \* \* \*